United States Patent
Goundiah Ramasamy et al.

(10) Patent No.: US 9,038,622 B2
(45) Date of Patent: May 26, 2015

(54) CONDENSATE COLLECTOR SYSTEM FOR MULTI-POISE GAS FURNACE SYSTEM

(75) Inventors: Jayashanger Goundiah Ramasamy, Indianapolis, IN (US); Brian A. Reeves, Indianapolis, IN (US); Larry D. Rieke, Zionsville, IN (US)

(73) Assignee: CARRIER CORPORATION, Farmington, CT (US)

( * ) Notice: Subject to any disclaimer, the term of this patent is extended or adjusted under 35 U.S.C. 154(b) by 782 days.

(21) Appl. No.: 13/237,496

(22) Filed: Sep. 20, 2011

(65) Prior Publication Data

US 2012/0090601 A1    Apr. 19, 2012

Related U.S. Application Data

(60) Provisional application No. 61/393,455, filed on Oct. 15, 2010.

(51) Int. Cl.
*F24H 3/08* (2006.01)
*F24H 8/00* (2006.01)

(52) U.S. Cl.
CPC ................ *F24H 3/087* (2013.01); *F24H 8/006* (2013.01); *Y02B 30/106* (2013.01)

(58) Field of Classification Search
CPC ....... F24H 8/006; F24H 3/087; Y02B 30/106; Y10S 165/913
USPC ................ 126/99 R, 110 R, 116 R; 165/913; 137/312, 314
See application file for complete search history.

(56) References Cited

U.S. PATENT DOCUMENTS

| | | | | |
|---|---|---|---|---|
| 4,515,145 A | * | 5/1985 | Tallman et al. | 126/99 A |
| 4,603,680 A | | 8/1986 | Dempsey et al. | |
| 4,738,307 A | * | 4/1988 | Bentley | 165/133 |
| 4,807,588 A | * | 2/1989 | Bentley et al. | 126/110 R |
| 4,848,314 A | * | 7/1989 | Bentley | 126/116 R |
| 4,899,726 A | | 2/1990 | Waterman | |
| 4,947,548 A | * | 8/1990 | Bentley | 29/890.039 |
| 5,046,478 A | | 9/1991 | Clawson | |
| 5,178,124 A | | 1/1993 | Lu et al. | |
| 5,257,904 A | | 11/1993 | Sullivan | |
| 5,309,890 A | * | 5/1994 | Rieke et al. | 126/110 R |
| 5,313,930 A | * | 5/1994 | Kujawa et al. | 126/116 R |
| 5,322,050 A | | 6/1994 | Lu | |
| 5,341,795 A | | 8/1994 | Chou et al. | |
| 5,370,175 A | * | 12/1994 | Waterman et al. | 165/79 |
| 5,375,586 A | * | 12/1994 | Schumacher et al. | 126/110 R |
| 5,379,749 A | * | 1/1995 | Rieke et al. | 126/110 R |
| 5,379,751 A | | 1/1995 | Larsen et al. | |
| 5,439,050 A | * | 8/1995 | Waterman et al. | 165/170 |
| 5,443,364 A | | 8/1995 | Mistry et al. | |
| 5,448,986 A | * | 9/1995 | Christopher et al. | 126/110 R |
| 5,547,232 A | | 8/1996 | Waterman | |
| 5,582,159 A | * | 12/1996 | Harvey et al. | 126/110 R |
| 5,704,343 A | * | 1/1998 | Ahn et al. | 126/110 R |
| 5,749,355 A | * | 5/1998 | Roan et al. | 126/110 R |
| 6,006,741 A | * | 12/1999 | Daddis, Jr. | 126/110 R |

(Continued)

*Primary Examiner* — Jorge Pereiro
(74) *Attorney, Agent, or Firm* — Cantor Colburn LLP

(57) ABSTRACT

A condensate collector system includes a condensate collector box having at least one condensate outlet port, and a condensate trap fluidly connected to the at least one condensate outlet port. The condensate trap is configured and disposed to be selectively positioned in multiple drain orientations relative to the condensate collector box to accommodate multiple installation configurations of the multi-poise gas furnace.

20 Claims, 5 Drawing Sheets

(56) References Cited

U.S. PATENT DOCUMENTS

| | | | |
|---|---|---|---|
| 7,036,498 B2 * | 5/2006 | Riepenhoff et al. | 126/110 R |
| 8,056,553 B2 * | 11/2011 | Khan | 126/116 R |
| 2003/0070672 A1 | 4/2003 | Ho et al. | |
| 2005/0126558 A1 * | 6/2005 | Riepenhoff et al. | 126/110 R |
| 2005/0155535 A1 * | 7/2005 | Rieke et al. | 110/349 |
| 2008/0314375 A1 * | 12/2008 | Khan | 126/116 R |
| 2012/0055465 A1 * | 3/2012 | Khan | 126/99 R |

* cited by examiner

CONDENSATE COLLECTOR SYSTEM FOR MULTI-POISE GAS FURNACE SYSTEM

CROSS REFERENCE TO RELATED APPLICATION

This application is a Non-Provisional Application of U.S. Provisional Application Ser. No. 61/393,455 filed Oct. 15, 2010.

BACKGROUND OF THE INVENTION

Exemplary embodiments pertain to the art of gas furnace systems and, more particularly, to a condensate collector system for a multi-poise gas furnace system.

Gas furnace systems burn a gas fuel to generate heat. Exhaust gases generated by burning the fuel are passed through a chimney or flue and discharged to, in most cases, ambient. In the flue, the exhaust gases begin to cool and form a liquid condensate. It is desirable to remove the liquid condensate from the flue in order to minimize negative effects on furnace functionality. A typical gas furnace includes a condensate collector system that is designed to capture and drain the liquid condensate. Conventional condensate collector systems include a condensate trap that constitutes a separate component that may be either mounted internally or externally to the gas furnace system and plumbed during installation using drain tubes.

BRIEF DESCRIPTION OF THE INVENTION

Disclosed is a condensate collector system for a multi-poise gas furnace. The condensate collector system includes a condensate collector box having at least one condensate outlet port, and a condensate trap fluidly connected to the at least one condensate outlet port. The condensate trap is configured and disposed to be selectively positioned in multiple drain orientations relative to the condensate collector box to accommodate multiple installation configurations of the multi-poise gas furnace.

Also disclosed is a method of configuring a condensate trap in a condensate collector box of a gas furnace. The method includes supporting a condensate trap upon a condensate collector box outlet port, selectively shifting the condensate trap into a desired orientation, and securing the condensate trap to the condensate collector box.

BRIEF DESCRIPTION OF THE DRAWINGS

The following descriptions should not be considered limiting in any way. With reference to the accompanying drawings, like elements are numbered alike.

DETAILED DESCRIPTION OF THE INVENTION

A detailed description of one or more embodiments of the disclosed apparatus and method are presented herein by way of exemplification and not limitation with reference to the Figures.

Figure 1:
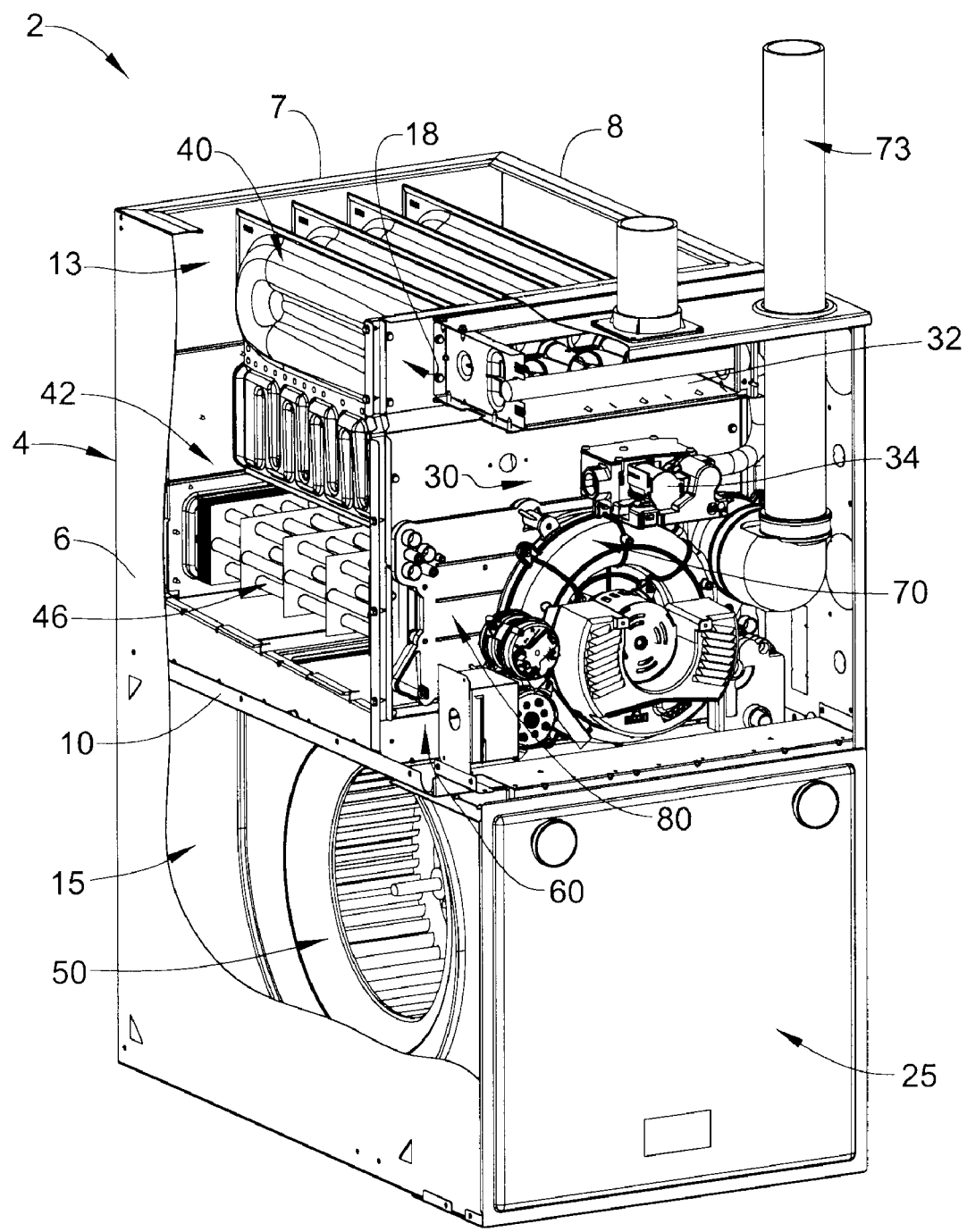
FIG. 1 is a left perspective view of a gas furnace system including a condensate collector system in accordance with an exemplary embodiment.

With reference to FIG. 1, a gas furnace system in accordance with an exemplary embodiment is indicated generally at 2. Gas furnace system 2 includes a housing 4 having a plurality of exterior walls 6-8 and an interior dividing wall 10 that forms a heat exchange portion 13 and a blower portion 15. Heat exchange portion 13 includes a component support wall 18 which, as will be discussed more fully below, provides structure for mounting various components of gas furnace system 2. Housing 4 is also shown to include an access panel 25 that provides access to blower portion 15 and another access panel (not shown) that provides access to heat exchange portion 13.

Gas furnace system 2 is also shown to include a burner assembly 30 mounted to component support wall 18. Burner assembly 30 includes a burner box 32 and a gas valve 34. Burner assembly 30 combusts a fuel, in the form of gas to generate heat used to condition comfort zones such as living spaces, work spaces and the like. Products of combustion or exhaust gases generated by the burning of the fuel are expelled to ambient. In the Exemplary embodiment shown, burner assembly 30 is operatively connected to a primary heat exchanger 40 arranged within heat exchange portion 13. Primary heat exchanger 40 is operatively coupled to a condensing heat exchanger 42 that includes a plurality of heat exchange members 46. With this arrangement, a blower motor assembly 50 arranged within blower portion 15 draws in air from a space to be heated. The air is guided over primary heat exchanger 40 and condensing heat exchanger 42. The air is heated and then re-introduced into the space.

During operation gas furnace system 2, moisture from the products of combustion condense in condensing heat exchanger 42. This moisture is collected and passed on to an external drain (not shown). The moisture is guided to a condensate collector system 60 that is secured to component support wall 18. As will be discussed more fully below, moisture is collected in condensate collector system 60 and passed to on to an external drain (not shown). Gas furnace system 2 further includes an inducer fan assembly 70 mounted to condensate collector system 60. Inducer fan assembly 70 creates an air flow that establishes a draft which draws the products of combustion from burner box 32 through heat exchanger 40 and condensing heat exchanger 42, and into a flue vent 73. More specifically, inducer fan assembly 70 produces a pressure rise and flow rate to achieve a desired combustion performance while overcoming flow losses within gas furnace system 2.

Figure 2:
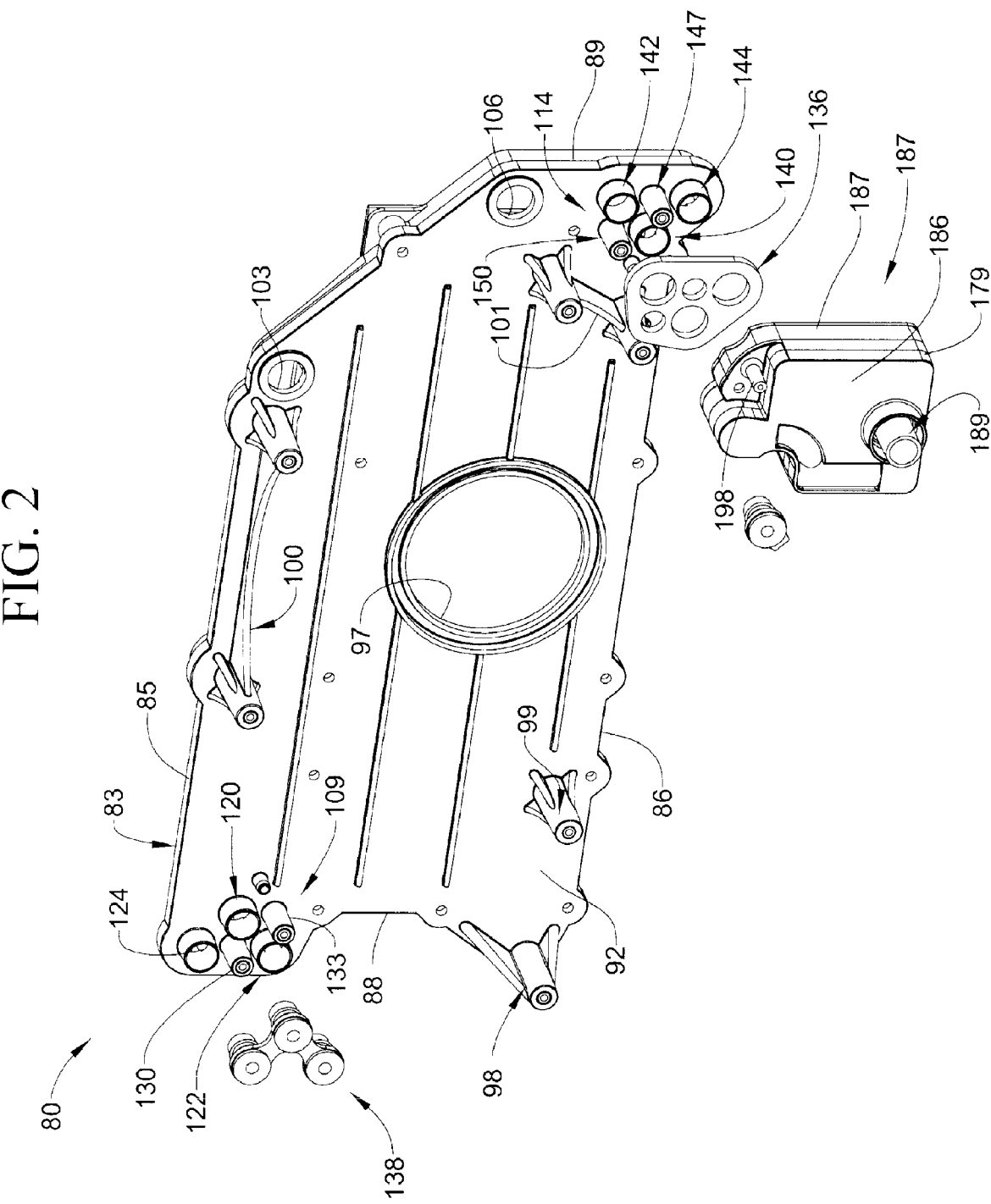
FIG. 2 is a perspective view of a condensate collector trap exploded from a condensate collector box of the condensate collector system of FIG. 1.
Figure 3:
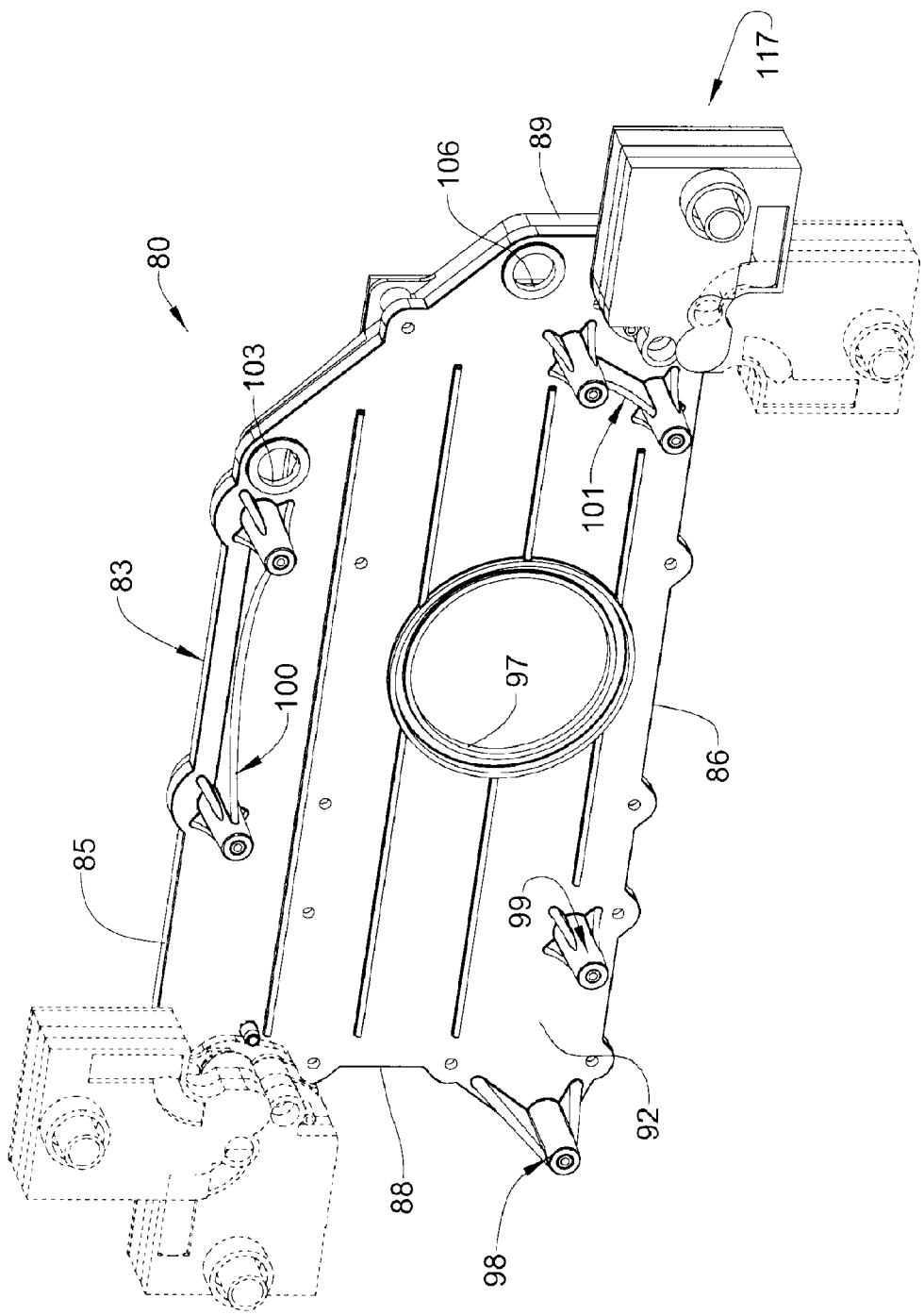
FIG. 3 is a perspective view of the condensate collector box of FIG. 2 illustrating multiple, alternative orientation configurations for the condensate trap.

As shown in FIG. 2, condensate collector system 60 includes a condensate collector box 80 having a main body 83 including first and second opposing edge portions 85 and 85 that are joined by third and fourth opposing edge portions 88 and 89. Edge portions 85, 86 and 88, 89 define a first surface 92 and a second, opposing surface (not shown). Main body 83 includes an inducer fan opening 97 that leads to heat exchange portion 13. Inducer fan opening 97 provides passage for an inducer air flow created by inducer fan assembly 70. Collector box 80 is shown to include a plurality of inducer fan mounting members 98-101. Collector box 80 also includes a first inducer fan drain opening 103 and a second inducer fan drain opening 106. Each inducer fan drain opening 103 and 106 selectively registers with an inducer fan drain passage (not shown) formed in inducer fan assembly 70. The particular one of inducer fan drain opening 103, 106 that registers with the inducer fan drain passage is dependent upon a desired installation configuration. More specifically, gas furnace system 2 is a multi-poise system that can be mounted in a variety of configuration. In a horizontal left configuration and a downflow configuration, inducer fan assembly 70 functions so as to fluidly register with first inducer fan drain opening 103. In an upflow configuration and a horizontal right configuration, inducer fan assembly 70 functions so as to fluidly register with second inducer fan drain opening 106. To further enhance installation flexibility, condensate collector box 80 includes a first condensate trap mounting arrangement 109 and a second condensate trap mounting arrangement 114. Each condensate trap mounting arrangement supports a condensate trap 117 in one of two orientations such as shown in FIG. 3, depending upon the installation configuration of gas furnace system 2.

First condensate trap mounting arrangement 109 includes a first condensate outlet port 120, a second condensate outlet port 122, and a third condensate outlet port 124. As will become more fully evident below, first condensate outlet port 120 directs flue vent condensate from heat exchange portion 13 into condensate trap 117. Second and third condensate outlet ports 122 and 124 pass condensate that develops flue vent 73 into condensate trap 117 depending upon the orientation of gas furnace system 2. First condensate trap mounting arrangement 109 is also shown to include a first condensate trap mounting member 130 and a second condensate trap mounting member 133. With this arrangement, condensate trap 117 can be selectively mounted in one of two distinct orientations such as shown in FIG. 3. For example, in a downflow configuration, condensate trap 117 is mounted to condensate trap mounting member 130 and positioned in fluid communication with condensate outlet ports 120 and 124. In a horizontal left configuration, condensate trap 117 is secured to condensate trap mounting member 133 and positioned in fluid communication with condensate outlet ports 120 and 122. Regardless of the orientation, a gasket 136 provides a fluid seal. However, in the event that condensate trap mounting arrangement 109 is not put to use, a plug system 138 seals off condensate outlet ports 120, 122, and 124.

Similarly, second condensate trap mounting arrangement 114 includes a first condensate outlet port 140, a second condensate outlet port 142, and a third condensate outlet port 144. As will become more fully evident below, first condensate outlet port 140 directs flue vent condensate from heat exchange portion 13 into condensate trap 117. Second and third condensate outlet ports 142 and 144 pass condensate that develops in flue vent 73 into condensate trap 117 depending upon the orientation of gas furnace system 2. Second condensate trap mounting arrangement 114 is also shown to include a first condensate trap mounting member 147 and a second condensate trap mounting member 150. With this arrangement, condensate trap 117 can be selectively mounted in one of two distinct orientations as shown in FIG. 3. For example, in an upflow configuration, condensate trap is mounted to condensate trap mounting member 147 and positioned in fluid communication with condensate outlet ports 140 and 144. In a horizontal right configuration, condensate trap 117 is secured to condensate trap mounting member 150 and positioned in fluid communication with condensate outlet ports 120 and 142.

Figure 4:
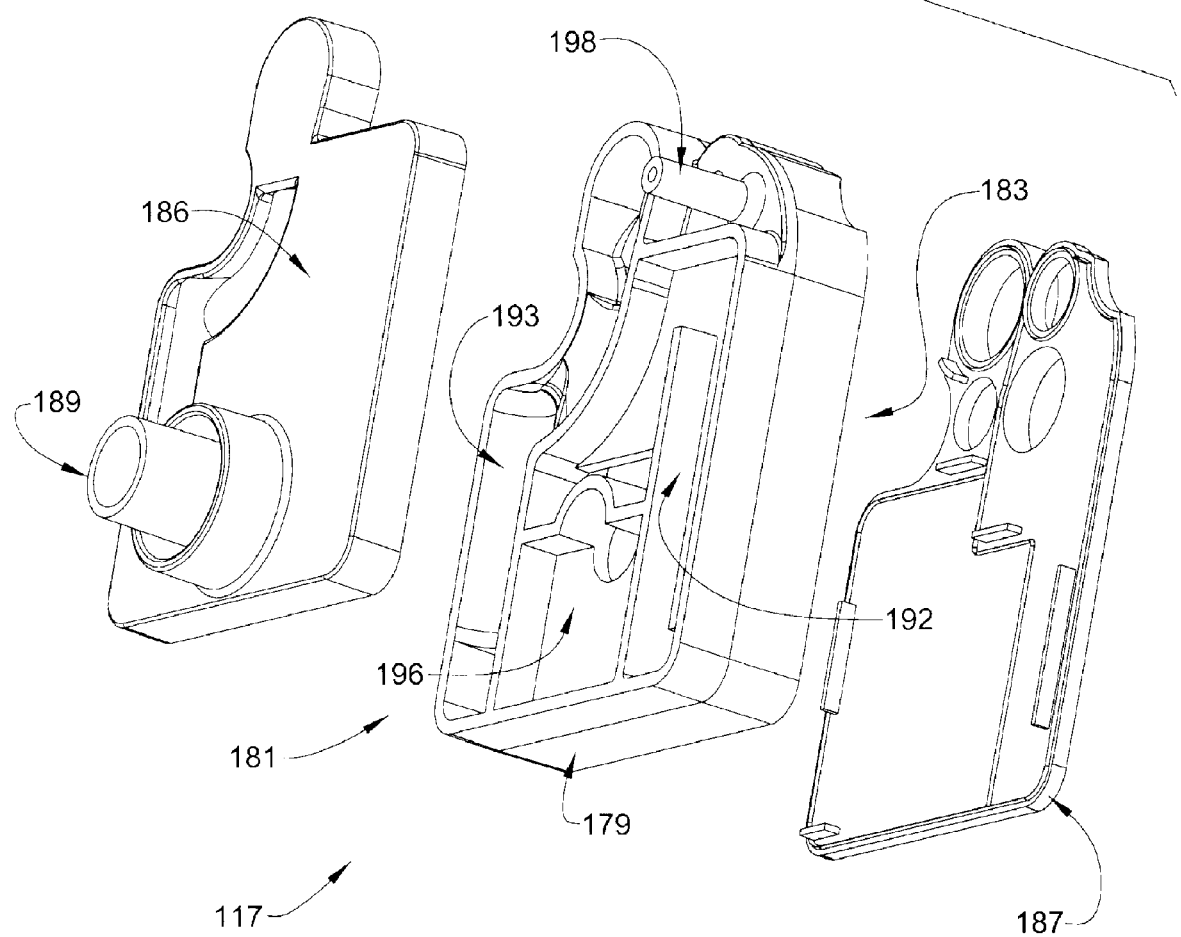
FIG. 4 is an exploded view of the condensate collector trap of FIG. 2.
Figure 5:
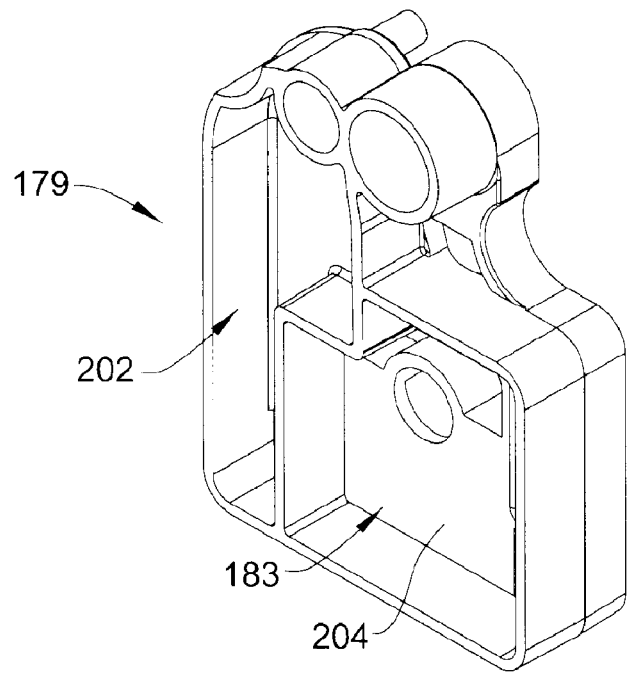
FIG. 5 is a rear plan view of a portion of a trap body portion of the condensate collector trap of FIG. 3.
Figure 6:
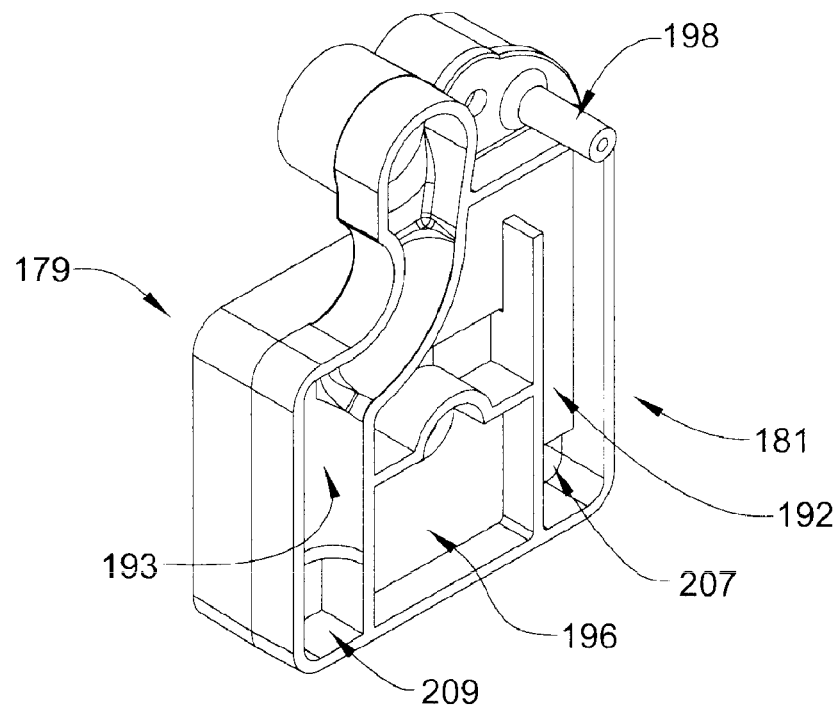
FIG. 6 is a front plan view of the trap body of FIG. 4.

Reference will now be made to FIGS. 4-6 in describing condensate trap 117 in accordance with an exemplary embodiment. Condensate trap 117 includes a trap body 179 having a first side 181 and a second side 183. First side 181 is provided with a first cover member 186 and second side 183 is provided with a second cover member 187. First cover member 186 includes a drain outlet member 189 that delivers condensate from condensate trap 117 to an external drain. In accordance with the exemplary embodiment, first side 181 of trap body 179 includes a first or positive pressure portion 192, a second or negative pressure portion 193, a drain chamber 196, and a pressure relief 198. Negative pressure portion 193 includes a curvilinear cross-section that reduces volume. Second side of trap body 179 includes a positive pressure chamber 202 and a drain chamber 204. Positive pressure portion 192 and positive pressure chamber 202 are fluidly connected to drain chamber 196 and receive condensate from flue vent 73. Negative pressure portion 193 is fluidly connected to drain chamber 204 and receives condensate that travels back from heat exchange portion 13. A first passage 207 that fluidly connects positive pressure portion 192 and positive pressure chamber 202 and a second passage 209 that fluidly connects negative pressure portion 193 and drain chamber 204. With this arrangement, condensate is collected in drain chambers 196 and 204. The condensate also acts as a barrier between the positive and negative pressure within trap body 179.

At this point it should be appreciated that the condensate collection system in accordance with the exemplary embodiments allows gas furnace system 2 to be positioned in multiple orientations without requiring extensive modification. By directly mounting the inducer fan assembly and condensate trap to the collector box there is no need for lengths of flexible tubing that must be re-routed and re-connected for each configuration. Moreover, the exemplary embodiments reduce an over all number of potential leak points by reducing the amount of drain tubing required for the gas furnace system.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof Therefore, it is intended that the invention not be limited to the particular embodiment disclosed as the best mode contemplated for carrying out this invention, but that the invention will include all embodiments falling within the scope of the claims.

What is claimed is:

1. A condensate collector system for a multi-poise gas furnace comprising:
  a condensate collector box having at least one condensate outlet port; and
  a condensate trap mounted to and fluidly connected with the at least one condensate outlet port, the condensate trap being configured and disposed to be selectively shiftable relative to the at least one condensate outlet port to accommodate multiple installation configurations of the multi-poise gas furnace.

2. The condensate collector system according to claim 1, wherein the at least one condensate outlet port includes a first condensate outlet port and a second condensate outlet port, the condensate trap being selectively mounted to and fluidly connected with one of the first and second condensate outlet ports.

3. The condensate collector system according to claim 2, wherein the condensate trap is selectively shiftable relative to the first outlet port between a first drain orientation and a second drain orientation and selectively shiftable relative to the second condensate outlet port between a third drain orientation and a fourth drain orientation.

4. The condensate collector system according to claim 1, wherein the condensate trap includes a trap body including a positive pressure portion, a negative pressure portion, and a drain chamber.

5. The condensate collector system according to claim 4, wherein the trap body includes a drain outlet fluidly connected to the drain chamber.

6. A method of configuring a condensate trap in a condensate collector box of a gas furnace, the method comprising:
supporting a condensate trap upon a condensate collector box outlet port;
selectively rotating the condensate trap upon the condensate collector box outlet port into a desired orientation; and
securing the condensate trap to the condensate box.

7. The method of claim 6, wherein shifting the condensate trap comprises rotating the condensate trap upon the condensate collector box outlet port.

8. The method of claim 6, further comprising: installing a gasket between the condensate trap and the condensate collector box.

9. The method of claim 6, wherein supporting the condensate trap upon the condensate collector box outlet port includes supporting the condensate trap upon one of a first condensate collector box outlet port and a second condensate collector box outlet port.

10. The method of claim 9, wherein selectively rotating the condensate trap into a desired orientation comprises rotating the condensate trap into one of a first drain orientation and a second drain orientation upon the first condensate collector box outlet port and one of a third drain orientation and a fourth drain orientation upon the second condensate collector box outlet port.

11. A condensate collector system for a multi-poise gas furnace comprising:
a condensate collector box having a first condensate outlet port, and a second condensate outlet port; and
a condensate trap fluidly connected to the at least one of the first and second condensate outlet port, the condensate trap being configured and disposed to be selectively positioned in multiple drain orientations relative to the condensate collector box to accommodate multiple installation configurations of the multi-poise gas furnace, wherein the condensate trap is selectively shiftable between a first drain orientation and a second drain orientation upon the first condensate outlet port and a third drain orientation and a fourth drain orientation upon the second condensate outlet port.

12. The condensate collector system according to claim 11, wherein the condensate trap includes a trap body having a first surface and an opposing second surface, the first surface having a first cover member and the second surface having a second cover member.

13. The condensate collector system according to claim 12, wherein the trap body includes a positive pressure portion, a negative pressure portion, and a drain chamber.

14. The condensate collector system according to claim 13, wherein the trap body includes a drain outlet fluidly connected to the drain chamber.

15. The condensate collector system according to claim 14, wherein the first cover member include a drain outlet member.

16. The condensate collector system according to claim 13, wherein the negative pressure portion includes a circular cross-section.

17. The condensate collector system according to claim 11, wherein the condensate trap is secured to the condensate collector box by no more than one fastener.

18. The condensate collector system according to claim 11, further comprising: a gasket arranged between the condensate collector box and the condensate trap.

19. The condensate collector system according to claim 11, wherein the condensate trap is directly fluidly connected to the at least one condensate outlet port.

20. The condensate collector system according to claim 11, wherein the condensate trap is configured and disposed to be selectively shiftable between a first drain orientation and a second drain orientation.

* * * * *